Dec. 20, 1960  R. VANDEN BERG  2,965,397
SELF-LOCKING DUCT TAKE-OFF
Filed Nov. 14, 1957  3 Sheets-Sheet 1
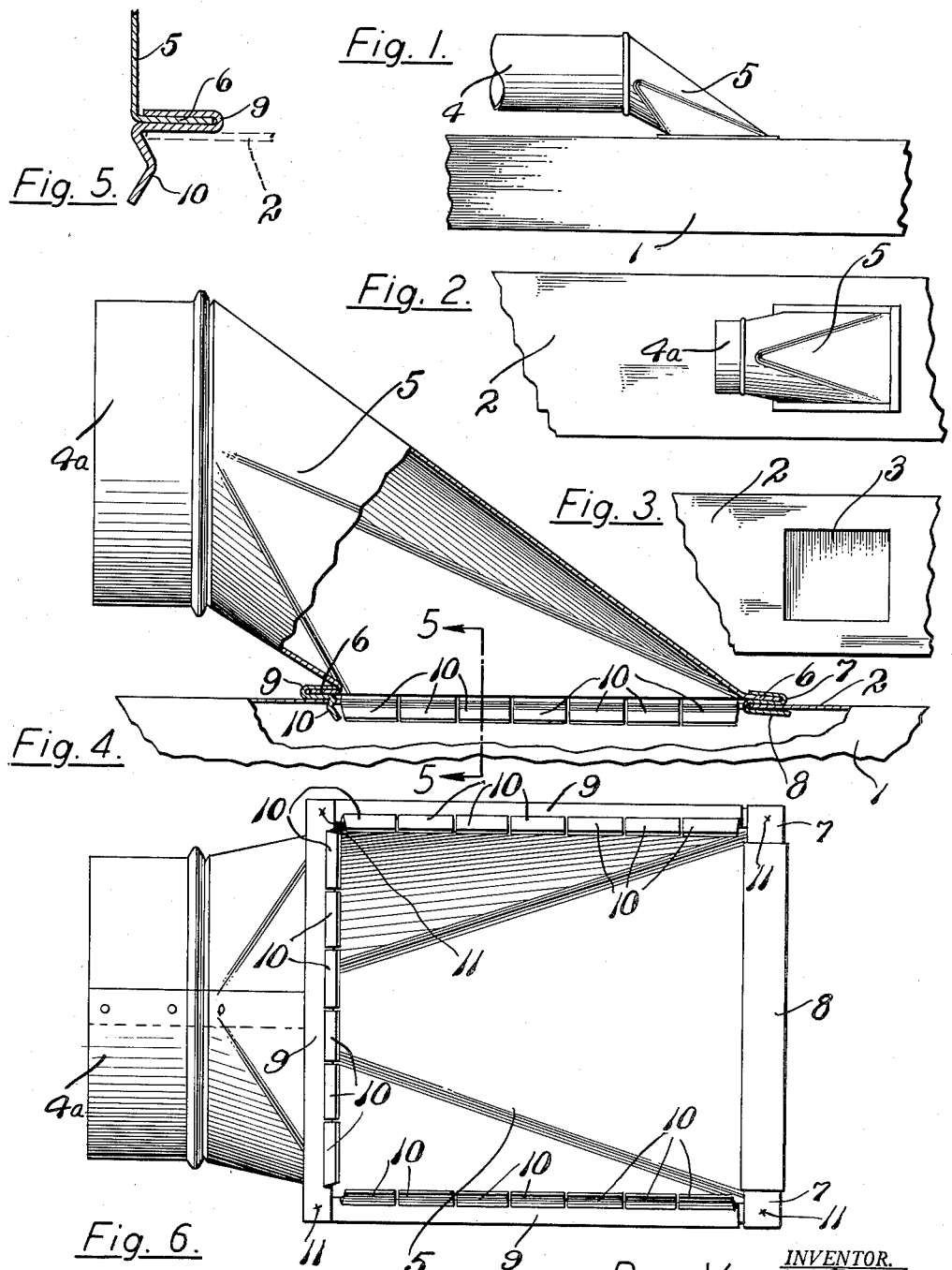
INVENTOR.
Roy Vanden Berg
BY Frank E. Liverance, Jr.
Attorney Dec. 20, 1960 R. VANDEN BERG 2,965,397
SELF-LOCKING DUCT TAKE-OFF
Filed Nov. 14, 1957 3 Sheets-Sheet 2
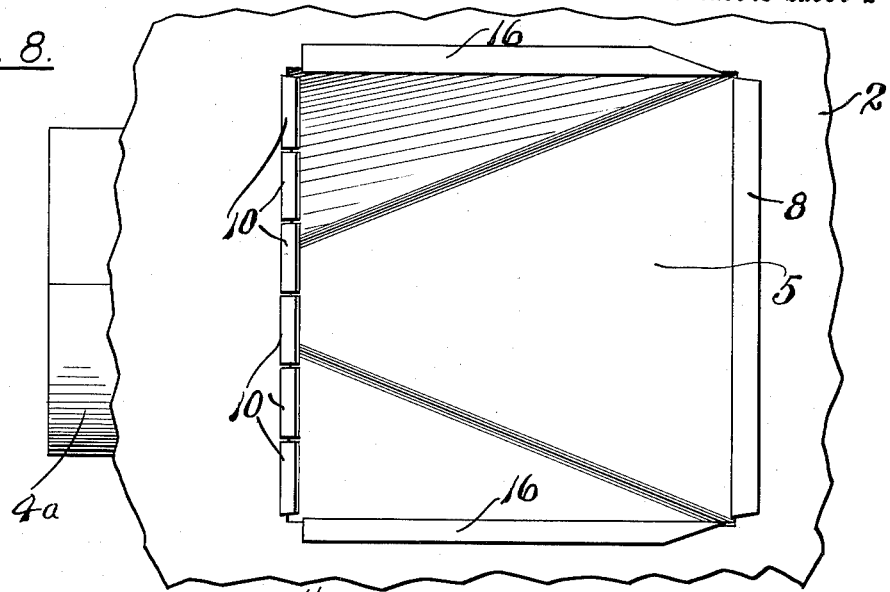
Fig. 8.
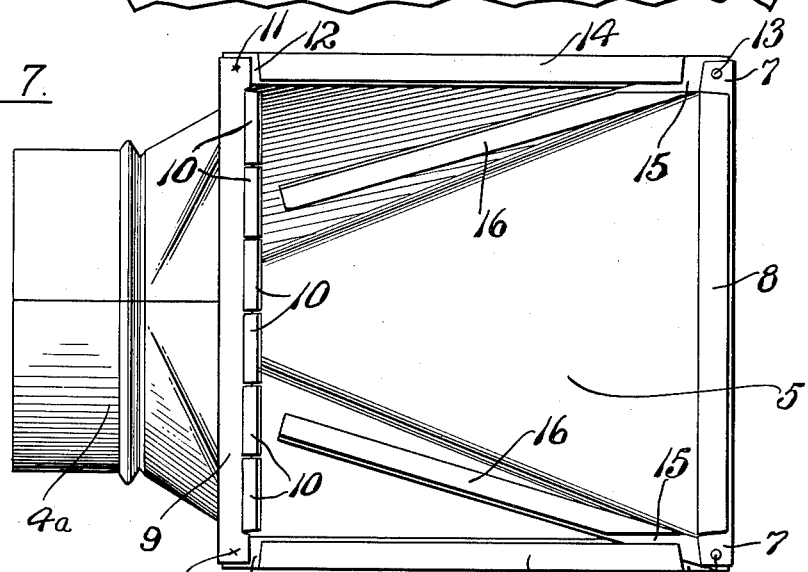
Fig. 7.
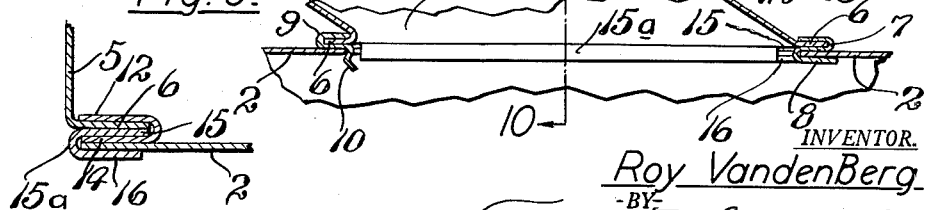
Fig. 9.
Fig. 10.
INVENTOR.
Roy VandenBerg
BY
Frank E. Liverance, Jr.
Attorney Dec. 20, 1960  R. VANDEN BERG  2,965,397
SELF-LOCKING DUCT TAKE-OFF
Filed Nov. 14, 1957  3 Sheets-Sheet 3
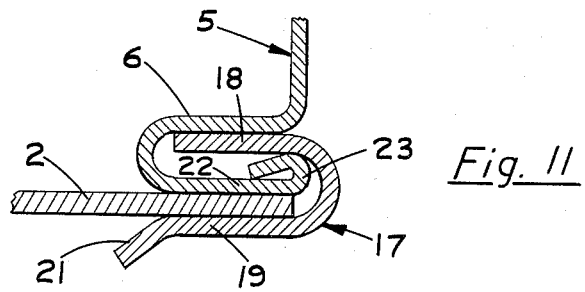
Fig. 11
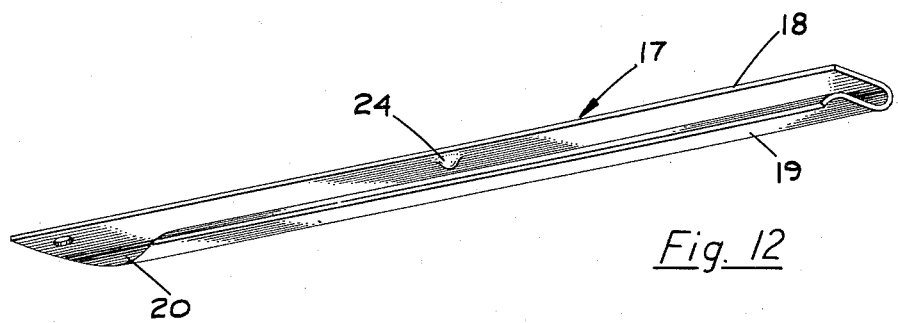
Fig. 12
Fig. 13
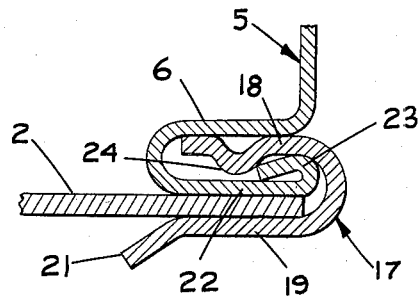
INVENTOR.
Roy VandenBerg
BY
Attorneys United States Patent Office 2,965,397
Patented Dec. 20, 1960

2,965,397

SELF-LOCKING DUCT TAKE-OFF

Roy Vanden Berg, Grand Rapids, Mich., assignor to Hendricks Supply Company, Inc., Grand Rapids, Mich., a corporation of Michigan Filed Nov. 14, 1957, Ser. No. 696,511

3 Claims. (Cl. 285—189)

This application is a continuation in part of co-pending application Serial No. 590,534, titled Self-Locking Top Take-Off, and filed June 11, 1956 in the name of this same inventor.

This invention relates to a self-locking, take-off device which is used primarily in hot air furnace installations for connecting branch pipes or conduits to major conduits, stacks, boxes or the like and through which air from a furnace may be conducted through take-offs and pipes conected therewith to carry air to different rooms or areas as may be desirable.

With my invention the flat side of an air duct, stack, flue, box or conduit, which is generally rectangular in cross section, has a rectangular opening made in a flat side thereof. The take-off connection of my invention is made between such duct opening and a pipe which leads to a selected place of delivery. The take-off connection is quickly applied and secured without the use of tools and requiring nothing except a proper location and pressure to snap it into place. When in place, it will not be accidentally or otherwise inadvertently disconnected.

The proposed take-off connection may also include certain features which eliminate the preciseness with which a receiving opening was previously required to be formed in the duct work with which it was to be associated. Such features include different members which overlap and cover the edges of the receiving opening at more than one side thereof.

A more thorough understanding of the invention may be had from the following description, taken in connection with the accompanying drawings.

In the drawings:

Fig. 1 is a side elevation view showing the take-off structure of my invention connected to a main duct at a side thereof and having connected therewith a delivery pipe.

Fig. 2 is a plan view of the structure shown in Fig. 1.

Fig. 3 is a fragmentary plan view illustrating the rectangular opening made in the top of the main air duct.

Fig. 4 is a fragmentary longitudinal enlarged vertical section and partial elevation view showing a take-off including certain features of my invention as disposed in place and in locked operative position.

Fig. 5 is a fragmentary transverse section substantially on the plane of line V—V of Fig. 4.

Fig. 6 is an under plan view of the self-locking take-off illustrated in Fig. 5.

Fig. 7 is an under plan view similar to Fig. 6 of a somewhat different form of the invention which attains the same securing of the take-off to the main conduit.

Fig. 8 is a similar under plan view showing the take-off of Fig. 7 secured to a side of a conduit with the final securing means in operative position.

Fig. 9 is a fragmentary longitudinal section, similar to Fig. 4, of the structure shown in Figs. 7 and 8.

Fig. 10 is an enlarged fragmentary vertical section on the plane X—X of Fig. 9.

Fig. 11 is an enlarged fragmentary vertical section, similar to Fig. 10, but taken in a direction opposite to the arrows of line X—X on Fig. 9 and of a slightly modified access opening latching means.

Fig. 12 is a perspective view of the modified latching means of Fig. 11.

Fig. 13 is another enlarged fragmentary vertical cross section, similar to Fig. 11, showing another feature of the modified access opening latching means proposed.

Like reference characters refer to like parts in the different figures of the drawings.

A main conduit for heated air, shown as rectangular in cross section, has spaced vertical sides 1 and a top 2 with a bottom paralleling the top. Where a branch or take-off pipe is to be connected therewith a rectangular opening 3 is made, for example, in the top 2 as shown in Fig. 3.

A branch pipe or conduit 4, which is to be supplied with warm air from the main conduit 1, at one end thereof has the novel take-off 5 of my invention secured thereto. Such take-off 5 has a neck 4a at its outer end over which the branch conduit or pipe 4 is telescoped and is flared outwardly or laterally on all sides so that at its open inner end it has an area generally the same as the rectangular opening 3. The free edge portions of the front, rear and the sides of such take-off 5 terminate in short outwardly extending flanges 6 bent from the respective sides of the take-off at the open end thereof, all the flanges 6 being in the same plane.

At what may be termed the front end of the take-off 5 the flange 6 is equipped with a sheet metal strip 7 substantially of Z-form in cross section, which terminates at its under side in a leg 8, the flange 6 entering the upper U of such strip 7 to connect therewith.

At each of the sides and rear of the take-off illustrated by Figs. 4 through 6, the flanges 6 have each connected therewith a U-shaped strip 9 which includes a depending or lower leg portion terminating in a plurality of downwardly extending integral snap clips 10 which are of the angular form best shown in Figs. 4 and 5. The lower leg 8 of the front strip 7 is cut away at each end to fit within the opening 3 and the strips or sheet metal members 9 and 7 are overlapped at their ends and are spot welded securely at such overlapping portions, at 11, thereby permanently securing the strips to the flanges 6 to make a rectangular frame around the open end of the take-off 5.

In securing the take-off 5 of Figs. 4 through 6 in place, the lower leg 8 of the front member 7 is inserted in the opening 3 and pushed underneath the front edge of the opening 3 in top 2 as shown in Fig. 4. Then the take-off 5 is pressed against its outer side with the yielding clips 10 riding against the side edges and the opposite end edge of said opening 3, until the clips, at the angle bend therein, pass by such edges of the opening, and snap into place. The edges of the sheet metal about the opening 3 in top 2 fit in grooves as shown in Figs. 4 and 5 at the juncture of the upper ends of said clips with the lower legs of the strips 9.

There is thus provided a secure, self-locking connection of the take-off to the top 2 of the main air duct. The attachment is accomplished almost instantly requiring no tools or skill in securing in place.

In Figs. 7 through 10 the construction of the take-off is the same as in the previously described structure at its front and rear ends. The back bar 9 of the rectangular frame described has the depending snap clips 10 and the front bar 7 of such frame is provided with the inner leg 8 which will pass against the inner side 2 of the duct at the opening 3 thereof.

The side bars 9 in the first described structure are replaced by two bars or strips 12 of U-shape in cross section which have the upper leg (Fig. 10) thereof disposed over and against its associated flange 6 and the lower leg 14 disposed in spaced relation to the flange 6, at each side of the take-off 5.

At opposite sides of the open frame and at the front corners thereof bars or strips 15a are pivotally connected. The bars or strips 15a are U-shaped in form and have an upper leg 15 and a lower leg 16, as shown in Fig. 10. The lower leg 16 is partly cut away at the end thereof adjacent the front corner of the frame while the upper leg 15 extends to and is pivotally mounted to the corner of the frame by a pivot pin 13 passing therethrough.

The under leg 14 of the U-shaped members 12 is received against the upper side 2 of the duct near the edge of the opening 3, as shown in Fig. 10. The pivotal strips or bars 15a, when swung into alignment with the side edges of the opening 3 in the duct top 2, will engage the lower leg 14 of the U-shaped members 12 and the edge of the duct 2 between legs 15 and 16 thereof to hold the take-off 5 in place over the access opening.

The bars 15a are swung inwardly toward each other at their free ends as in Fig. 7 when the take-off is applied to the main duct over the opening 3 therein. The leg 8 is first connected with the duct at the front side of said opening and the back edge of the take-off is then pressed into place, the yielding clips 10 connected at the opposite or rear end of said opening being the same as described in the first form of structure. Then by reaching in at an open end of the selection of the main duct in which the opening 3 is made at a side thereof, or through the take-off, the pivoted bars 15a are swung to parallel the adjacent sides of the frame and provide a telescoping connection as shown in Fig. 10 with the lower leg 14 of the side frame bar 12 and the side edges of the top 2 of the duct.

Such structure as described securely connects the take-off with the main duct but such securing is one of a releasable nature. Release is by swinging the last mentioned bars 15a to the position shown in Fig. 7 and then pulling upwardly on the take-off to release the clips 10 and thereafter moving the take-off bodily to draw the leg 8.

An improved form of pivotal bar connection for the side edge engagement of the take-off 5 to the edges of the opening 3 in the duct top 2 is shown by Figs. 11 through 13.

The improved pivotal bars 17 are similar to the pivotal bars 15a in that spaced upper and lower legs 18 and 19, respectively, are included and the end of the lower leg 19 is cut away as at 20. However, the bars 17 also have the outermost edge of the lower leg 19 bent slightly downward, or opened, to provide a lip portion 21. The depending lip 21 greatly assists in the telescoping assembly of the pivotal bars 17 over the flanged edge of the take-off and the edge of the duct opening by guiding the bar into engagement therewith.

Another improvement, as regards the pivotal bar connection, includes having the flanges 6, which are formed from the take-off member 5 about the opening therein, bent back under themselves to provide a spaced flange 22 that will serve the same function as the lower leg 14 of the U-shaped members 12 used in the construction shown in Figs. 7 through 10.

It has also been found advantageous to have the extreme edge of the lower flange 22 curled over at its free end to provide a rolled edge 23. The rolled edge 23 in cooperation with the inclined guide lip 21 ease the initial engagement of the pivotal bar 17 to the flanges 22. It will also be appreciated that the resilience of the lower flange 22 assists in holding the leg 18 of the pivotal bars engaged between flanges 6 and 22.

A still further noteworthy feature in the structure illustrated in Figs. 11 through 13 is the detent 24 formed in the upper leg 18 of each of the pivotal bars 17. The detent 24 extends into the U-shaped portion thereof.

The detent serves as a locking shoulder in cooperation with the curled edge 23 formed on the spaced flange 22, as shown in Fig. 13, to prevent inadvertent disengagement therefrom. At the same time it is readily disengaged therefrom upon application of a positive force.

It will be appreciated that the curled edge 23 and detent features 24 may be included as a portion of the structure illustrated in Figs. 7 through 10.

The use of the pivotal bar connections 15a or 17 and the front edge connecting member 8, each of which overlap and cover the edge of the opening 3 engaged thereby, eliminate any great necessity that the opening 3 be formed to precisely the dimensions of the end of the take-off member received thereover. Since the overlapping members have a certain width and extend the full length of the side of the take-off with which associated, and since the flange 6 of the take-off itself lies on top of the duct through which the opening is formed, considerable leeway is allowed for any irregularity in the opening cut in the take-off receiving duct without exposing such irregular cut edges or permitting any loss of the air conducted through the connected duct work. This advantage is shown by the illustrated take-off on the front and side edges only in Figs. 7 through 13 though quite obviously the rear snap-on connection could also be similar to the side edge pivotal bar connection. The illustrated embodiment of this invention is considered to show the preferable combination of take-off connections for the most satisfactory assembly with regard to both secure engagement and quick assembly.

It is apparent that the proposed take-offs may be applied at other places in a duct than the top as it can be secured in the structure shown at any flat side. The invention, moreover, is not limited in use to connection of the take-off to a flat side of a main air duct, though in general it will be used substantially universally in such manner. Sides of main ducts having other forms than flat can have the take-off applied thereto by conforming the take-off at its open end to the side of the main duct to which it is to be connected.

The invention is practical and useful, economically produced and in practice has proven especially satisfactory.

The invention is defined in the appended claims and is to be considered comprehensive of all forms of structure coming within their scope.

I claim:

1. A take-off member for use with sheet metal duct work and having an end thereof adapted for engagement with such duct work over a relatively complementary opening provided therein, said take-off member comprising: flange means about the periphery of said open end, said flange means being adapted to overlap the outside of said duct work about the periphery of said opening; means provided on opposite sides of the open end of said take-off for interlocking engagement with relatively complementary edges of said duct opening, said means on one of said opposite sides of said take-off including laterally disposed and spaced flanges provided near the open end thereof and disposed to receive said complementary edge of said duct opening therebetween, said means on the other of said opposite sides of said take-off including a plurality of spring clip members formed to engage both surfaces of the edge of said duct opening with which they are engaged, and a pivotal member provided on each of the remaining sides of the open end of said take-off and having spaced flanges disposed for removable engagement about an edge of said duct opening.

2. A take-off member for use with sheet metal duct work and having an end thereof adapted for engagement with such duct work over a relatively complementary opening provided therein, said take-off member comprising: flange means about the periphery of said open end, said flange means being adapted to overlap the outside of said duct work about the periphery of said opening; means provided on opposite sides of the open end of said take-off for interlocking engagement with relatively complementary opposite edges of said duct opening, means provided on the other sides of the open end of said take-off for readily removable engagement about the other edges of said duct opening, and said removably engageable means each comprises a pivotal member having spaced leg portions disposed for engagement about an edge of said duct opening; and laterally disposed flanges provided at the open end of said take-off member on the sides thereof engageable by said pivotal members, said flanges being disposed for engagement within said pivotal members as received adjacent an edge of said duct opening engageable thereby, and said flanges including outwardly formed and reversely bent spaced leg portions for frictionally receiving a leg of one of said pivotal members therein to hold said pivotal member to said flange and against inadvertent disengagement therefrom.

3. A take-off member for use with sheet metal duct work and having an end thereof adapted for engagement with such duct work over a relatively complementary opening provided therein, said take-off member comprising: flange means about the periphery of said open end, said flange means being adapted to overlap the outside of said duct work about the periphery of said opening; means provided on opposite sides of the open end of said take-off for interlocking engagement with relatively complementary opposite edges of said duct opening, means provided on the other sides of the open end of said take-off for readily removable engagement about the other edges of said duct opening, and said removably engageable means each comprises a pivotal member having spaced leg portions disposed for engagement about an edge of said duct opening; and laterally disposed flanges provided at the open end of said take-off member on the sides thereof engageable by said pivotal members, said flanges being disposed for engagement within said pivotal members as received adjacent an edge of said duct opening engageable thereby, a detent formed in one of the legs of said pivotal members, and a rolled edge formed on said flanges and disposed for engagement by said detent for holding said pivotal members to said flanges and against inadvertent disengagement therefrom and from the edge of said duct opening received therein.

References Cited in the file of this patent
UNITED STATES PATENTS

| | | |
|---|---|---|
| 1,605,872 | Tinnerman | Nov. 2, 1926 |
| 1,871,453 | Cobb | Aug. 16, 1932 |
| 1,949,055 | Lambie | Feb. 27, 1934 |
| 2,227,587 | Jones et al. | Jan. 7, 1941 |
| 2,246,722 | DelCamp | June 24, 1941 |
| 2,275,572 | Somers | Mar. 10, 1942 |
| 2,585,887 | Woodward | Feb. 12, 1952 |
| 2,799,518 | Anderson et al. | July 16, 1957 |
| 2,880,017 | Anderson | Mar. 31, 1959 |

OTHER REFERENCES

Standard Catalog No. 55, copyright 1955, pages 6–7, Standard Furnace Supply Co., Omaha, Nebraska.

Clix-On Price Schedule 1216–10, Dec. 1, 1956, Standard Furnace Supply, supra, page 10.